(12) United States Patent
Collard et al.

(10) Patent No.: US 8,913,784 B2
(45) Date of Patent: Dec. 16, 2014

(54) NOISE REDUCTION IN LIGHT DETECTION AND RANGING BASED IMAGING

(75) Inventors: Corey J. Collard, Plano, TX (US);
Vernon R. Goodman, Rockwell, TX (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 13/220,131

(22) Filed: Aug. 29, 2011

(65) Prior Publication Data

US 2013/0051655 A1 Feb. 28, 2013

(51) Int. Cl.
*G06K 9/00* (2006.01)
*G06K 9/62* (2006.01)
*G01S 17/10* (2006.01)
*G01S 17/89* (2006.01)
*G01S 7/487* (2006.01)
*G01S 7/486* (2006.01)

(52) U.S. Cl.
CPC ............ *G01S 7/4861* (2013.01); *G01S 17/10* (2013.01); *G01S 17/89* (2013.01); *G01S 7/4873* (2013.01); *G01S 7/4876* (2013.01); *G01S 7/487* (2013.01)
USPC ........... 382/103; 382/100; 382/104; 382/106; 382/154; 382/159

(58) Field of Classification Search
USPC ......................................................... 382/154
See application file for complete search history.

(56) References Cited

U.S. PATENT DOCUMENTS

| | | | |
|---|---|---|---|
| 4,910,786 A * | 3/1990 | Eichel ........................... 382/199 |
| 5,005,418 A | 4/1991 | Anderson |
| 5,027,658 A | 7/1991 | Anderson |
| 5,090,245 A | 2/1992 | Anderson |
| 5,134,884 A | 8/1992 | Anderson |
| 5,257,085 A | 10/1993 | Ulich et al. |
| 5,298,905 A * | 3/1994 | Dahl ............................... 342/54 |
| 5,384,589 A | 1/1995 | Ulich et al. |
| 5,450,125 A | 9/1995 | Ulich et al. |
| 5,612,779 A * | 3/1997 | Dunne ......................... 356/5.01 |

(Continued)

OTHER PUBLICATIONS

Cho, Hyoun-Myoung, et al. "Depolarization ratio and attenuated backscatter for nine cloud types: analyses based on collocated CALIPSO lidar and MODIS measurements." Optics express 16.6 (2008): 3931-3948.*

(Continued)

*Primary Examiner* — Michelle Entezari
(74) *Attorney, Agent, or Firm* — Burns & Levinson LLP; Joseph M. Maraia; Nikhil Patel (57) ABSTRACT

A method, in accordance with particular embodiments, includes receiving voxel data for a plurality of voxels. Each voxel is associated with a unique volume of space associated with a geographic area. The voxel data for each respective voxel includes one or more values based on one or more reflections from one or more light pulses from a LIDAR system. The method further includes identifying noise values from among the one or more values for each respective voxel. The method additionally includes determining a baseline threshold comprising a static value that is uniform for each of the voxels. The method additionally includes determining a dynamic threshold that varies between the voxels and is based on the identified noise values. The method further includes applying the baseline and dynamic thresholds to the voxel data to generate filtered voxel data. The method also includes generating a three-dimensional image based on the filtered voxel data.

17 Claims, 3 Drawing Sheets

(56) References Cited

U.S. PATENT DOCUMENTS

| | | |
|---|---|---|
| 6,246,468 B1 | 6/2001 | Dimsdale |
| 6,330,523 B1 | 12/2001 | Kacyra et al. |
| 6,420,698 B1 | 7/2002 | Dimsdale |
| 6,473,079 B1 | 10/2002 | Kacyra et al. |
| 6,512,518 B2 | 1/2003 | Dimsdale |
| 6,512,993 B2 | 1/2003 | Kacyra et al. |
| 6,734,849 B2 | 5/2004 | Dimsdale et al. |
| 6,739,511 B2 | 5/2004 | Tsikos et al. |
| 6,847,462 B1 | 1/2005 | Kacyra et al. |
| 6,857,570 B2 | 2/2005 | Tsikos et al. |
| 6,863,216 B2 | 3/2005 | Tsikos et al. |
| 6,880,756 B2 | 4/2005 | Tsikos et al. |
| 6,969,001 B2 | 11/2005 | Tsikos et al. |
| 6,971,576 B2 | 12/2005 | Tsikos et al. |
| 6,974,373 B2 | 12/2005 | Kriesel |
| 6,991,165 B2 | 1/2006 | Tsikos et al. |
| 7,028,899 B2 | 4/2006 | Tsikos et al. |
| 7,090,133 B2 | 8/2006 | Zhu |
| 7,184,036 B2 | 2/2007 | Dimsdale et al. |
| 7,215,430 B2 | 5/2007 | Kacyra et al. |
| 7,236,235 B2 | 6/2007 | Dimsdale |
| 7,527,200 B2 | 5/2009 | Tsikos et al. |
| 7,633,048 B2 | 12/2009 | Doran et al. |
| 7,639,840 B2 * | 12/2009 | Hanna et al. .................. 382/103 |
| 7,697,748 B2 | 4/2010 | Dimsdale et al. |
| 7,738,151 B2 | 6/2010 | Garner et al. |
| 7,991,222 B2 | 8/2011 | Dimsdale et al. |
| 8,068,385 B2 * | 11/2011 | Jiang ............................... 367/97 |
| 8,121,348 B2 * | 2/2012 | Hayasaka et al. ............. 382/103 |
| 8,503,826 B2 * | 8/2013 | Klimenko ..................... 382/294 |
| 2002/0059042 A1 | 5/2002 | Kacyra et al. |
| 2002/0145607 A1 | 10/2002 | Dimsdale |
| 2002/0149585 A1 | 10/2002 | Kacyra et al. |
| 2002/0158870 A1 | 10/2002 | Brunkhart et al. |
| 2003/0001835 A1 | 1/2003 | Dimsdale et al. |
| 2003/0118246 A1 * | 6/2003 | August ......................... 382/260 |
| 2003/0212327 A1 * | 11/2003 | Wang et al. ................... 600/437 |
| 2004/0028265 A1 * | 2/2004 | Nishide ......................... 382/131 |
| 2004/0051711 A1 | 3/2004 | Dimsdale et al. |
| 2005/0099637 A1 | 5/2005 | Kacyra et al. |
| 2006/0006309 A1 | 1/2006 | Dimsdale et al. |
| 2006/0007422 A1 | 1/2006 | Dimsdale |
| 2007/0252974 A1 | 11/2007 | Dimsdale |
| 2008/0132774 A1 * | 6/2008 | Milstein et al. ............... 600/407 |
| 2008/0226035 A1 * | 9/2008 | Masuda et al. ................ 378/145 |
| 2008/0277567 A1 | 11/2008 | Doran et al. |
| 2009/0119010 A1 | 5/2009 | Moravec |
| 2009/0136103 A1 | 5/2009 | Sonka et al. |
| 2009/0232355 A1 | 9/2009 | Minear et al. |
| 2009/0232388 A1 | 9/2009 | Minear et al. |
| 2010/0045674 A1 | 2/2010 | Clifton |
| 2010/0188504 A1 | 7/2010 | Dimsdale et al. |
| 2010/0226532 A1 * | 9/2010 | Hayasaka et al. ............. 382/103 |
| 2011/0107270 A1 * | 5/2011 | Wang et al. ................... 715/850 |
| 2011/0199376 A1 | 8/2011 | Salemann |
| 2011/0202326 A1 | 8/2011 | Salemann |
| 2011/0202538 A1 | 8/2011 | Salemann |
| 2011/0203553 A1 | 8/2011 | Chiba |
| 2011/0243470 A1 * | 10/2011 | Noguchi ........................ 382/239 |
| 2013/0129178 A1 * | 5/2013 | Wieczorek .................... 382/131 |

OTHER PUBLICATIONS

Rogers, Raymond R., et al. "Assessment of the CALIPSO Lidar 532 nm attenuated backscatter calibration using the NASA LaRC airborne High Spectral Resolution Lidar." Atmospheric Chemistry and Physics 11.3 (2011): 1295-1311.*

* cited by examiner

NOISE REDUCTION IN LIGHT DETECTION AND RANGING BASED IMAGING

TECHNICAL FIELD

The present disclosure relates generally to methods and systems for reducing noise in light detection and ranging based imaging.

BACKGROUND

Light detection and ranging (LIDAR) can be used to create three-dimensional imagery of a geographic area. A LIDAR system includes a light source, such as a laser, that generates and directs pulses of light. The light pulses are reflected by the surface of various objects, such as the ground, a tree, or a building. A sensor in the LIDAR system detects the reflections. The relative elevation of the reflecting surface can be determined from the elapsed time from when the light pulse is generated and when it is detected. This cycle of pulse and detection may be repeated thousands of times per second.

In some LIDAR systems, the light source may generate a dispersed light pulse and the sensor may comprise a two-dimensional array of individual sensors that detect the reflections. This may allow the LIDAR system to capture the reflection times for each pulse over a relatively wide area. Thus, any particular point within the geographic area being scanned may have data from several reflections associated therewith. Furthermore, because the light source, and the LIDAR system itself, are moving, the sensor may, at different times detect reflections from different objects (e.g., tree leaves and the ground) at different elevations within the same post (e.g., the area extending vertically from a particular point within the area being scanned). The reflections from multiple pulses may be combined into a voxel. A voxel may represent a volume of space associated with a geographic area.

SUMMARY

The teachings of the present disclosure relate to methods and systems for reducing noise in light detection and ranging based imaging. For example, a method for reducing noise may include receiving voxel data for each of a plurality of voxels. Each voxel may be associated with a unique volume of space that is associated with a geographic area. The voxel data for each respective voxel includes one or more values based on one or more reflections from one or more light pulses from a light detection and ranging (LIDAR) system. The method further includes identifying noise values from among the one or more values for each respective voxel. The method additionally includes determining a baseline threshold comprising a static value that is uniform for each of the plurality of voxels. The method additionally includes determining a dynamic threshold that varies between the plurality of voxels. The dynamic threshold may be based on the identified noise values. The method further includes applying the baseline threshold and the dynamic threshold to the voxel data to generate filtered voxel data. The method also includes generating a three-dimensional image based on the filtered voxel data.

Technical advantages of particular embodiments may include generating a three-dimensional image that is filtered based on a dynamic threshold. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
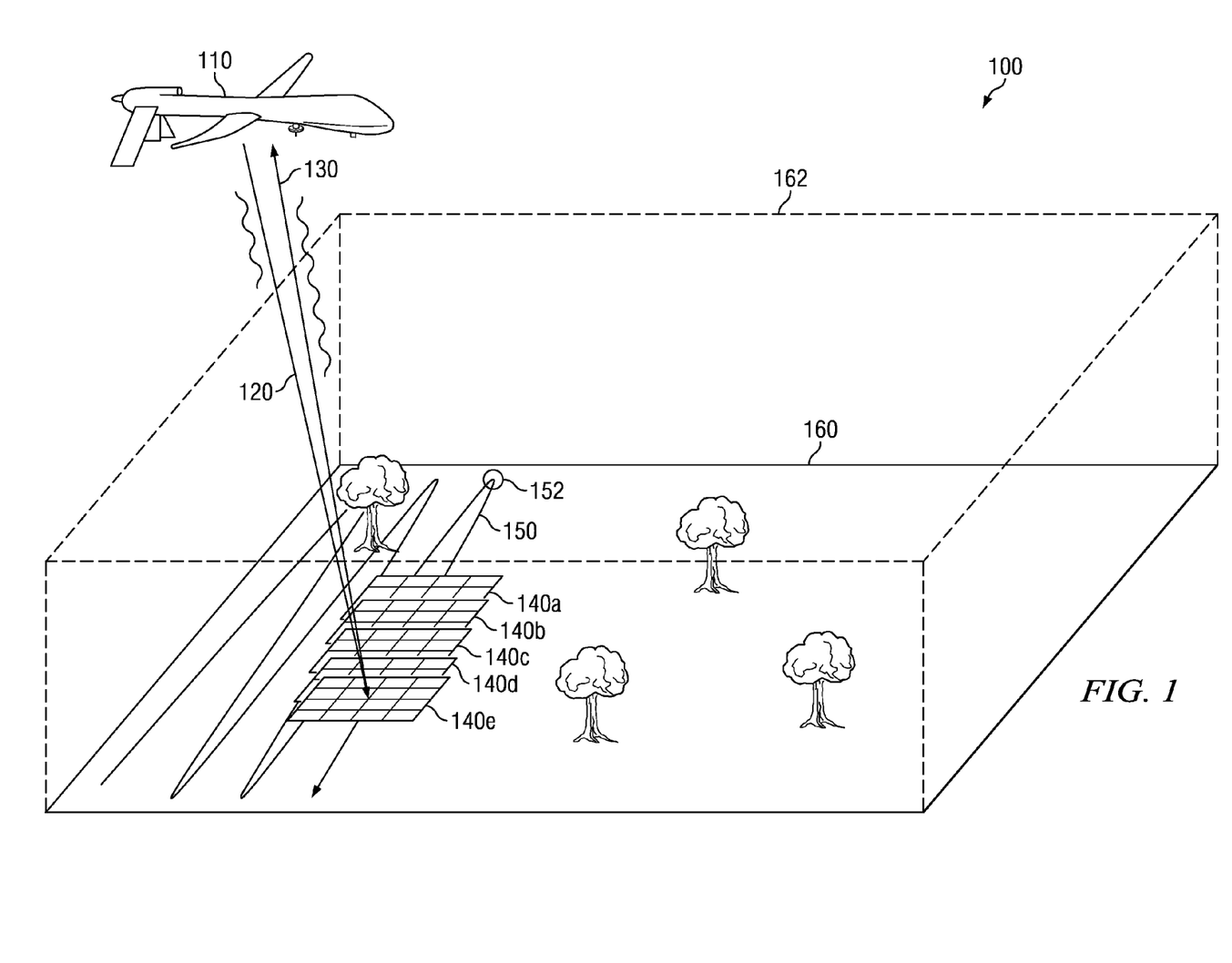
FIG. 1 illustrates a simplified diagram of a scenario in which LIDAR data is acquired, in accordance with a particular embodiment.

FIG. 1 illustrates a simplified diagram of a scenario in which voxel data is generated, in accordance with a particular embodiment. In scenario 100 plane 110 is flying over, and scanning, geographic area 160. Plane 110 may be using a LIDAR system to scan geographic area 160. The LIDAR system may be configured to generate voxel data based on the detection of reflections 130 from light pulses 120. The voxel data may be used to generate a three-dimensional (3D) image (e.g., image 410 depicted in FIG. 4) of geographic area 160. A portion of the voxel data may include reflections 130 that may be considered noise. For example, stray light, fog, smoke, and/or errant reflections may create noise that may be detected by the LIDAR system. Typical LIDAR systems attempted to filter out this noise through a uniform user defined noise threshold value. For example, the user may interact with a user interface of a typical LIDAR system to adjust the noise threshold up or down to achieve the desired result. The user selected noise threshold would be applied uniformly to all the voxel data used to generate the three-dimensional image. However, such a user selected threshold requires user input to set the threshold and, when set, does not account for spatial variations in the detected noise.

As plane 110 flies over geographic area 160, the LIDAR system in plane 110 may generate thousands of light pulses 120 per second. The light pulses are generated by a light source that is able to generate a focused beam of light along a known direction. The amount of focus (e.g., how narrow or wide) of pulse 120 may vary depending on the LIDAR system used and/or operational needs. The light source may scan the light pulses from side-to-side, constantly changing the direction of light pulse 120. In particular embodiments, there may be some overlap in the geographical area covered by subsequent light pulses. The scanning motion of the light source, combined with the movement of plane 110 may result in scan pattern 150. Scan pattern 150 may result in more light pulses being generated at the edges (e.g., the edges parallel to the flight path of plane 110) of geographic area 160 than in the middle. This increase in the number light pulses may result in the LIDAR system detecting more noise along two of the edges of geographic area 160 than in the middle.

The rate at which pulses 120 are generated, and the size of the area covered by each pulse 120 (e.g., pulse area 140), are such that multiple reflections 130 may be detected for a given area. The given area may correspond to a voxel. A voxel may comprise a volume of space for which reflection data is organized. A voxel may be similar to a three-dimensional pixel. For example, geographic area 160 and the space above geographic area 160, space 162, may be divided into a plurality of voxels, such as the 27 voxels depicted in FIG. 3.

The data associated with each voxel may be based on multiple reflections 130. For example, a particular voxel may include reflections 130 from pulse areas 140b and 140c. In addition to the reflections from consecutive light pulses, the same voxel may also include reflections 130 from one or more non-consecutive light pulses (e.g., light pulses generated before the light source changed directions, such as at point 152). The multiplicity of reflections associated with a voxel may be averaged, scaled, or otherwise combined with itself and/or neighboring voxels to determine the voxel data.

The voxel for which a particular reflection 130 is associated may depend on location, speed, and/or flight path of plane 110, the direction of the light source, and the time between when pulse 120 is generated and when the corresponding reflection 130 is detected. A given pulse 120 may create multiple reflections that may be detected at different times. For example, if there was a tree within pulse area 140e, reflections 130 from the top of the tree may be detected sooner than reflections 130 from the ground. The timing information may be used to determine the relative elevation of the object from which pulse 120 is reflected. Different elevations may correspond to different voxels.

Depending on the embodiment and/or scenario the LIDAR system may use any of a variety of detectors including detectors having a single pixel and detectors having an array of pixels. For example, in certain embodiments, the LIDAR system may comprise Geiger-mode avalanche photodiode (GmAPD) sensors. GmAPD sensors may have relatively large spatial variations in noise level due to periodic changes in the sampling rate per post. As mentioned above, a post may generally refer to a vertical stack of voxels (e.g., voxels v313, v312 and v311 in FIG. 3) associated with a particular area within geographic area 160. Part of the spatial variation may be attributed to the changing speed at which the light source changes directions and the sinusoidal scan pattern 150 used by the LIDAR system—there are more pulses 120 and reflections 130 for a post associated with a portion of geographic area 160 in which scan pattern 150 changes directions, such as at point 152.

In particular embodiments, the spatial variation in noise created by scan pattern 150 may result in there being a greater level of noise at the lateral edges of geographic area 160. The lateral edges may be the two edges parallel to, and farthest from, the flight path of airplane 110. The noise between the two edges of geographic area 160 that are perpendicular to the flight path of plane 110 may vary in an approximately sinusoidal manner corresponding to scan pattern 150.

In certain embodiments, the relative amount of noise being detected by the LIDAR system at various points within geographic area 160 may be estimated from the voxel data for voxels for which there should not be reflections (e.g., voxels that are above the ground). Once reflections 130 have been received, the ground, and any objects (e.g., buildings, trees, vehicles) within geographic area 160 may be identified. Reflections above the elevation of the ground and the identified objects may be considered noise. As discussed above, this noise may be used to determine a dynamic threshold that accounts for the spatial variations in the noise detected by the LIDAR system. The dynamic threshold may be applied to the voxel data to filter out the noise.

Although a particular scenario is depicted and described with respect to FIG. 1, the voxel data may be generated in any of a variety of different scenarios. Moreover, the components used to generate the voxel data may vary from the components discussed above with respect to FIG. 1. Furthermore, the size and spacing of pulse areas 140 may vary depending on the scenario and/or operational needs.

Figure 2:
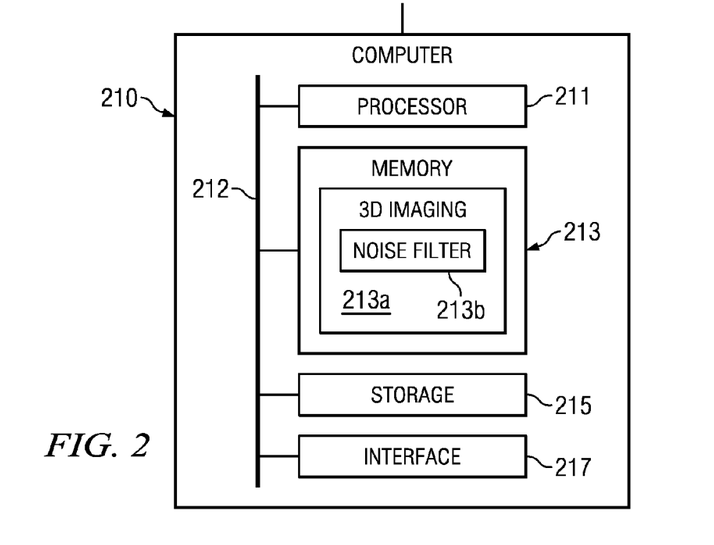
FIG. 2 illustrates a block diagram of a computer configured to dynamically filter voxel data, in accordance with a particular embodiment.

FIG. 2 illustrates a block diagram of a computer configured to dynamically filter voxel data, in accordance with a particular embodiment. The depicted computer 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of computer 210 may comprise any suitable physical form, configuration, number, type and/or layout. As an example, and not by way of limitation, computer 210 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 210 may include one or more computer systems; be unitary or distributed; span multiple locations; span multiple machines; or reside in a cloud, which may include one or more cloud components in one or more networks. In one embodiment, computer 210 may be a component of, integrated in, or coupled to a LIDAR system.

Where appropriate, computer 210 may perform without substantial spatial or temporal limitation one or more steps of one or more methods described or illustrated herein. As an example, and not by way of limitation, computer 210 may perform in real time or in batch mode one or more steps of one or more methods described or illustrated herein. One or more computers may perform at different times or at different locations one or more steps of one or more methods described or illustrated herein, where appropriate.

In the depicted embodiment, computer 210 may include processor 211, memory 213, storage 215, interface 217, and bus 212. These components may work together to analyze, filter, and/or process voxel data provided via LIDAR. Although a particular computer is depicted as having a particular number of particular components in a particular arrangement, this disclosure contemplates any suitable computer having any suitable number of any suitable components in any suitable arrangement. For simplicity, only the components of computer 210 are depicted. Other devices, such as the light source and sensors used in generating the voxel data, may be coupled to computer 210 (e.g., via interface 217) but are not depicted herein.

Processor 211 may be a microprocessor, controller, or any other suitable computing device, resource, or combination of hardware, software and/or encoded logic operable to provide, either alone or in conjunction with other components (e.g., memory 213), the ability to filter noise from a 3D image using a dynamic threshold that accounts for spatial variation in noise levels between voxels. This functionality may further include providing various other features discussed herein. For example, processor 211 may determine one or more histograms for the noise detected by LIDAR.

In particular embodiments, processor 211 may include hardware for executing instructions, such as those making up a computer program. As an example, and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215. The instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. Memory 213 may store any suitable data or information utilized by computer 210, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. For example, memory 213 may include 3D imaging logic 213a that may be configured to generate a 3D image from the received voxel data. In some embodiments, memory 213 may also include noise filter logic 213b that may be configured to create and apply a dynamic threshold.

In particular embodiments, one or more memory management units (MMUs) may reside between processor 211 and memory 213 and facilitate accesses to memory 213 requested by processor 211. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate.

In some embodiments, computer 210 may, by way of example and not by way of limitation, load instructions from storage 215 or another source (such as, for example, another computer system) to memory 213. Processor 211 may then load the instructions from memory 213 to an internal register or an internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

Bus 212 may include any combination of hardware, software embedded in a computer readable medium, and/or encoded logic incorporated in hardware or otherwise stored (e.g., firmware) to couple components of computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

In particular embodiments, storage 215 may include mass storage for data or instructions. As an example and not by way of limitation, storage 215 may include an HDD, a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer 210, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include one or more interfaces for one or more I/O devices. One or more of these I/O devices may enable communication between a person and computer 210. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. In certain embodiments, one interface of interface 217 may receive user input manipulating the view of a 3D image presented on a display device via a second interface of interface 217. An I/O device may include one or more sensors. Particular embodiments may include any suitable type and/or number of I/O devices and any suitable type and/or number of interfaces 217 for them. Where appropriate, interface 217 may include one or more devices or encoded software drivers enabling processor 211 to drive one or more of these I/O devices. Interface 217 may include one or more interfaces 217, where appropriate.

In certain embodiments, interface 217 may comprise any combination of hardware, encoded software, or a combination of hardware and encoded software configured to receive voxel data generated from a sensor of a LIDAR system. In some embodiments, the voxel data may be received via interface 217 from a remote LIDAR system. For example, the LIDAR system may be on a plane, while computer 210 may be on the ground. In some embodiments, the voxel data may be received via interface 217 from a local LIDAR system. For example, computer 210 may share one or more components with, or be physically connected to, the LIDAR system and/or both computer system 210 and the LIDAR system may on the plane.

Herein, reference to a computer-readable storage medium encompasses one or more tangible, non-transitory, computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Computer 210 may be coupled to a network. The term "network" should be interpreted as generally defining any network or combination of networks capable of transmitting signals, data, and/or messages, including, but not limited to, signals, file transfer protocols, data or messages transmitted through WebPages, e-mail, text chat, voice over IP (VoIP), and instant messaging. Generally, the network may provide for the communication of packets, cells, frames, or other portions of information (generally referred to as packets herein) between the various components. In some embodiments, voxel data may be communicated from the LIDAR system to computer 210 via the network.

The following example may help illustrate at least one way in which the components of computer 210 may work to dynamically filter voxel data, in accordance with a particular embodiment. In this example, processor 211 may load, or otherwise execute, 3D imaging software 213*a* and/or noise filter software 213*b*. The loaded software may then be used along with interface 217 to receive voxel data for each of a plurality of voxels. The voxel data may be communicated to processor 211 via bus 212. Each voxel may be associated with a volume of space associated with a particular geographic area. The geographic area includes the ground and the space above the ground, up to a certain elevation. The voxel data may be generated by a LIDAR system that has scanned the geographic area.

Processor 211 may use the voxel data along with instructions in the loaded software to determine a baseline threshold. The baseline threshold may be a static value that may be uniform across all of the voxels. In some embodiments, the baseline threshold may be determined based on a percentage of the average number of light pulses generated per post (e.g., per vertical stack of voxels). For example, the total number of light pulses generated during the scan of the geographic area may be divided by the number of posts associated with the geographic area (e.g., length (in voxles)*width (in voxels) of the geographic area). Once the baseline threshold has been determined, it may be stored in memory 213 and/or storage 215.

The baseline threshold may be modified by a dynamic threshold to account for spatial variances in the amount of noise detected between voxels. These spatial variances may be inherent in the way a LIDAR system scans a geographic area. For example, the LIDAR system may generate more light pulses along two parallel edges of the geographic area than through the middle of the geographic area. Processor 211 may account for these spatial variances by processing the voxel data to identify the noise values from the voxel data. In certain embodiments, processor 211 may first identify the ground and other objects within the voxel data. This may be used as a basis for determining a noise region (e.g., the voxels for the space above the ground and identified objects) and a signal and noise region (e.g., the voxels for the space that includes the ground and identified objects).

In certain embodiments, the spatial variation in the concentration of noise may be determined through histograms of the noise region. In particular embodiments, the concentration of noise may be determined by counting the amount of noise per post in the noise region. Some embodiments may use other statistical techniques or methods for modeling or representing the spatial distribution of noise. The resulting dynamic threshold may be stored in memory 213 and/or storage 215.

Processor 211 may adjust the baseline threshold based on the dynamic threshold. For example, in some embodiments, processor 211 may multiply the baseline threshold by the dynamic threshold. The result may then be applied to the voxel data by processor 211 to filter out noise. The noise may be filtered from both the noise region and the noise and signal region. The filtered voxel data may then be used by processor 211 to generate a three-dimensional image.

In some embodiments, processor 211 may further analyze the filtered data to correct the photon intensity of certain voxels. This may compensate for differences in the reflective characteristics of different materials (e.g., voxels associated with a road). The three dimensional image is then sent to a display device via interface 217.

Thus far, several different embodiments and features have been presented. Particular embodiments may combine one or more of these features depending on operational needs and/or component limitations. This may allow for great adaptability of computer 210 to the needs of various organizations and users. Some embodiments may include additional or different features. In particular embodiments, the functionality of computer 210 may be provided by additional or different devices.

Figure 3:
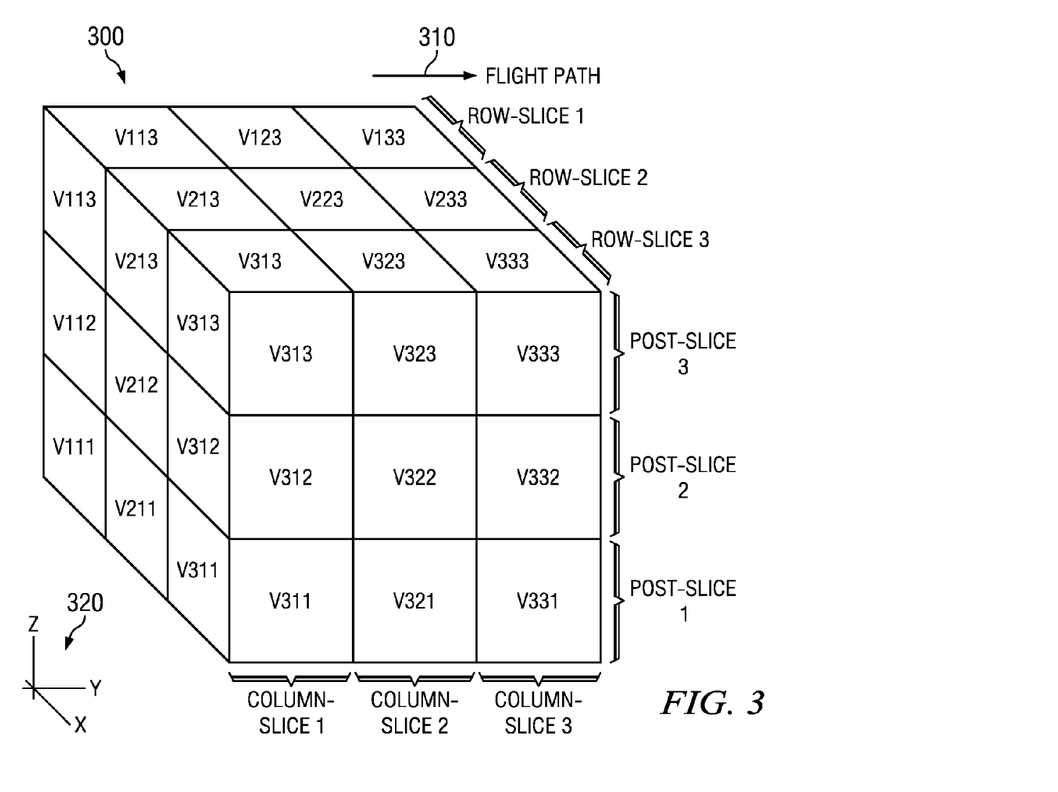
FIG. 3 illustrates a block diagram of a representation of a plurality of voxels associated with a LIDAR scan, in accordance with a particular embodiment.
Figure 4:
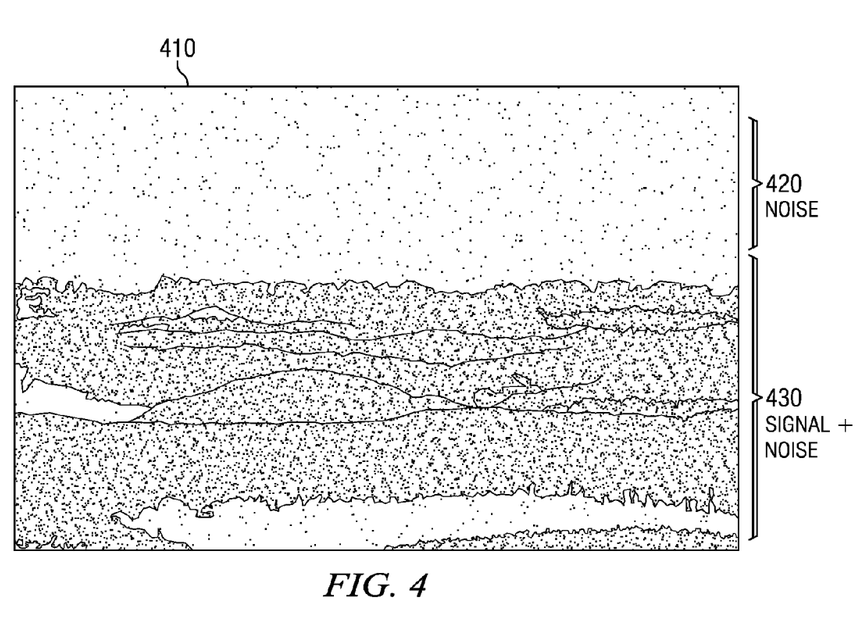
FIG. 4 illustrates a sample screen shot of a three-dimensional image based on a LIDAR scan, in accordance with a particular embodiment.

FIG. 3 illustrates a block diagram of a representation of a plurality of voxels associated with a LIDAR scan, in accordance with a particular embodiment. FIG. 4 illustrates a sample screen shot of a three-dimensional image based on a LIDAR scan, in accordance with a particular embodiment. For purposes of explanation and simplicity, it may be assumed that voxels 300 correspond to the geographic area represented in screen shot 410. In practice, the number of voxels actually used in generating a screen shot would be much greater (e.g., three-hundred million voxels for a 100 m×100 m×30 m volume). Each voxel of voxels 300 represents the reflections from a corresponding volume of the geographic area in screen shot 410. The real world volume for a voxel may vary depending on the resolution used to represent the geographic area and the size of the geographic area. For example, increasing the amount of area while maintaining the same number of voxels may increase the amount real-world volume associated with each voxel.

The individual voxels within voxels 300 are numbered based on their spatial relationship wherein the first number corresponds to the row, the second number corresponds to the column, and the third number corresponds to the post. In particular, with respect to 3D Cartesian key 320, each voxel in a particular row will have the same "X" coordinate, but a different combination of "Y" and "Z" coordinates; each voxel in a particular column will have the same "Y" coordinate, but a different combination of "X" and "Z" coordinates; and each voxel in a particular post will have the same "Z" coordinate, but a different combination of "X" and "Y" coordinates. For simplicity, a slice may refer to all the voxels in a particular row, column, or post. For example, row-slice 3 may comprise voxels v311, v321, v331, v312, v322, v332, v313, v323, and v333.

In screen shot 410, two different zones, noise zone 420 and signal and noise zone 430 have been identified. Noise zone 420 may comprise one or more post-slices of voxels 300 (e.g., post-slice 3 comprising voxels v113, v123, v133, v213, v223, v233, v313, v323, and v333). Noise zone 420 may correspond to an area in which there are no objects of interest (e.g., the air above the land of a geographic area). Thus, any reflections, whether from particles (e.g., dust, clouds, fog, moisture, debris, blowing leaves, etc.) or from errant reflections, within noise zone 420 may be considered noise. Additionally, in some embodiments and/or scenarios the noise may be generated internally by the sensor at random positions and/or times. Noise and signal zone 430 may correspond to the area associated with the ground (including any hills or valleys) and any objects of interest that may rise above the ground (e.g., buildings, trees, cars, or any natural or man-made structures). In certain embodiments, a processor of a computer may differentiate between noise zone 420 and signal and noise zone 430 by looking for clusters of reflections. For example, where a cluster is identified, the processor may determine that an object of interest may be creating the cluster of reflections. For example, a car would produce a cluster of reflections and may thus be identified as an object of interest. The number of voxels that may need to be clustered together may be based on the real-world volume associated with a particular voxel and/or any settings or parameters associated with the size of an object that should be considered an object of interest.

Figure 5:
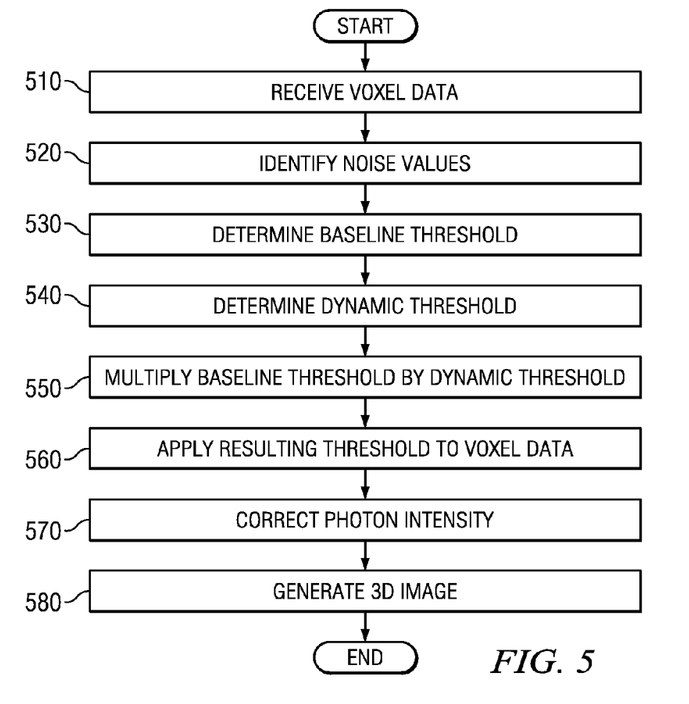
FIG. 5 illustrates a method for reducing noise in LIDAR based imaging, in accordance with a particular embodiment.

FIG. 5 illustrates a method for reducing noise in LIDAR based imaging, in accordance with a particular embodiment. The following description of FIG. 5 may rely on FIGS. 3 and 4 as reference. In certain embodiments, the method of FIG. 5 may be performed by a computer, such as computer 210 of FIG. 2. The method begins at step 510 with the computer receiving voxel data. The voxel data may be associated with a plurality of voxels. In some embodiments, the computer may receive raw data, such as a point cloud with azimuth, elevation, and range from the sensor or raw x,y,z coordinates. The raw data may then be converted and/or arranged into the voxel data.

For purposes of illustration, the voxel data is associated with voxels 300 depicted in FIG. 3. As discussed above, each voxel is associated with a unique volume of space associated with a geographic area. For purposes of illustration, the geographic area corresponds to the geographic area shown in screenshot 410 depicted in FIG. 4. Each voxel comprises one or more values based on one or more reflections from one or more light pulses from a light detection and ranging (LIDAR) system. In certain embodiments, fifty or more reflections may be received for each post. From the fifty reflections, a single value may be determined using any of a variety of known statistical methods (e.g., average, weighted average, mean, etc.).

The voxel data may be collected from a LIDAR system scanning the geographic area from an airplane. The airplane's speed, orientation, direction of flight may be used along with timing information (e.g., a time from when the pulse is generated and when a reflection is detected) to correlate the received reflections with the appropriate voxel.

At step 520 the computer identifies the noise values from the voxel data. In some embodiments, the noise values may be identified from the voxels associated with noise zone 420. In such an embodiment, the computer may determine where the boundary is between noise zone 420 and signal and noise zone 430.

At step 530 the computer determines a baseline threshold. The baseline threshold may be a static value that is the same for each of the plurality of voxels. In some embodiments, the baseline threshold may be based on a fixed percentage (e.g., five percent) of the number of light pulses that were transmitted per post. For example, the total number of light pulses generated when creating the scan of the geographic area may be divided by the total number of voxels in a post-slice (e.g., nine for post-slices 1, 2, and 3). The total number of voxels in a post-slice may be the same as the number of posts. A post may comprise a vertical stack of voxels (e.g., v311, v312 and v313).

At step 540 the computer determines a dynamic threshold. The dynamic threshold may be based on the amount of noise that is detected. The dynamic threshold may vary between the plurality of voxels. The variation between voxels may correspond to the spatial variations inherent in a LIDAR system. In particular, the light source responsible for generating the light pulses does not continuously move at a constant rate. For example, when changing directions (e.g., at an edge of scan sweep, such as at point 152 in FIG. 1) the light source may slow down. As another example, the speed of the plane may fluctuate. Regardless of the cause, certain areas of the geographic area will receive a greater a number of light pulses than other areas. The greater the number of light pulses generated in any particular area, the greater the amount of noise that will be detected. For example, if the light source scans left-to-right across the flight path of the plane, then the noise may be greater along the left and right edges of the scanned area than in the middle of the scanned area. The dynamic threshold may also allow the computer to better filter localized environmental noise (e.g., a small cloud).

One way in which the computer may determine the dynamic threshold is to count the noise associated with each post (e.g., each vertical stack of voxels). In certain embodiments, the counted noise may only include the noise counted in noise zone 420. For voxels 300, this may result in a 3×3 array of count values. The resulting noise count array may then be filtered through a low-pass filter. The low-pass filter may help smooth variations in the noise count values between voxels. In some embodiments, the filtered noise count array may be scaled. This may provide a value that may more appropriately be applied as a threshold to the voxel data. For example, in certain embodiments the filtered noise count array may be scaled to a maximum of 1 (e.g., by dividing all values in the filtered noise count array, by the maximum value in the filtered noise count array).

Another way in which the computer may determine the dynamic threshold is through histograms. For example, the computer may determine an along-path histogram and a cross-path histogram. The along-path histogram may be based on the noise among voxels 300 following along flight path 310. Each along-path histogram value may correspond to the noise in a particular column-slice. The noise may be limited to noise from voxels associated with noise zone 420. If it is assumed that the bottom post-slice, post-slice 1 corresponds to signal and noise zone 430, and the upper two post-slices, post-slice 2 and post-slice 3 correspond to noise zone 420, then the first value of the along-path histogram may be based on the noise from voxels v113, v213, v313, v112, v212, and v312. This may be repeated for each column-slice along the direction of flight path 310. The cross-path histogram may be based on the noise among voxels 300 perpendicular to flight path 310. Each cross-path histogram value may correspond to the noise in a particular row-slice. The noise may be limited to noise from voxels associated with noise zone 420. If it is assumed, as before, that post-slice 1 corresponds to signal and noise zone 430, and post-slices 2 and 3 correspond to noise zone 420, then the first value of the cross-path histogram may be based on the noise from voxels v313, v323, v333, v312, v322, v332. This may be repeated for each row-slice, moving through the row-slices perpendicular to flight path 310.

In some embodiments, both the cross-path histogram and the along-path histogram may be scaled, for example to a maximum value of 1 (e.g., by dividing all values in each histogram by the maximum value in each respective histogram). Once both the cross-path histogram and the along-path histogram are determined, they may be multiplied together. This may produce the dynamic threshold. Other techniques may be used to statistically, or otherwise, represent the spatial variation in the noise count between voxels in noise zone 420.

At step 550 the computer multiplies the baseline threshold by the dynamic threshold. The resulting threshold value is then applied to the voxel data by the computer at step 560. The resulting threshold may be applied to all voxels, including voxels in noise region 420 and signal and noise region 430. This may allow the computer to filter out the noise from signal and noise region 430 in a dynamic manner that takes into account the spatial variance in noise levels between voxels 300. This may provide a more accurate and cleaner image than may be achieved using a standard uniform threshold. Moreover, this may allow the computer to adjust the threshold without requiring user input.

At step 570 the computer corrects the photon intensity. This may aid in correcting for the varying reflectivity of different objects. For example, a concrete road may reflect more light (thus providing greater photon intensity) than an asphalt road.

At step 580 the computer generates a 3D image. For example, screenshot 410 may be a screenshot of a 3D image generated from a LIDAR scan that has been dynamically filtered for noise.

While the embodiment depicted in FIG. 5 includes a certain number of steps, depicted in a certain order, it is to be understood that other embodiments may have more, fewer or different steps, and the steps may be rearranged or performed simultaneously. For example, in some embodiments, a computer may determine the baseline threshold before the dynamic threshold. As another example, in some embodiments, two different computers (or two different processors or processor cores within the same computer) may be used to determine the dynamic and baseline thresholds in parallel. As yet another example, in some embodiments, the steps above may be performed as part of a process in which raw data from a sensor is voxelized.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2, according to operational needs or desires. Furthermore, the elements of computer 210 and various LIDAR systems may be combined, rearranged or positioned in order to accommodate particular scanning or imaging needs. In addition, any of these elements may be provided as separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims.

What is claimed:

1. A method comprising:
receiving voxel data for each of a plurality of voxels, each voxel associated with a unique volume of space associated with a geographic area, the voxel data for each respective voxel comprising one or more values based on one or more reflections from one or more light pulses from a light detection and ranging (LIDAR) system;
identifying noise values from among the one or more values for each respective voxel;
determining a baseline threshold comprising a static value that is uniform for each of the plurality of voxels;
determining a dynamic threshold that varies between the plurality of voxels, the dynamic threshold based on the identified noise values, wherein the variation of the dynamic threshold between the plurality of voxels corresponds to spatial variations inherent in the LIDAR system;
applying the baseline threshold and the dynamic threshold to the voxel data to generate filtered voxel data;
generating a three-dimensional image based on the filtered voxel data;
determining an along-path histogram based on noise values from among the one or more values for each respective voxel along a flight path of the LIDAR system;
determining a cross-path histogram, the cross-path histogram based on noise values from among the one or more values for each respective voxel perpendicular to the flight path of the LIDAR system; and
multiplying the along-path histogram by the cross-path histogram.

2. The method of claim 1, wherein:
the voxels are arranged in a three-dimensional pattern comprising a plurality of rows, columns, and posts arranged orthogonally to one another, wherein:
each row of the plurality of rows comprises a plurality of voxels arranged substantially parallel to the flight path;
each column of the plurality of columns comprises a plurality of voxels arranged substantially perpendicular to the flight path; and
each post of the plurality of posts comprises a plurality of voxels arranged in a substantially vertical stack; and
determining an along-path histogram comprises, for each column of voxels, determining a total noise count based on a sum of noise from a plurality of posts from a plurality of rows from a respective column.

3. The method of claim 1, wherein:
the voxels are arranged in a three-dimensional pattern comprising a plurality of rows, columns, and posts arranged orthogonally to one another, wherein:
each row of the plurality of rows comprises a plurality of voxels arranged substantially parallel to the flight path;
each column of the plurality of columns comprises a plurality of voxels arranged substantially perpendicular to the flight path; and
each post of the plurality of posts comprises a plurality of voxels arranged in a substantially vertical stack; and
determining a cross-path histogram comprises, for each row of voxels, determining a total noise count based on a sum of noise from a plurality of posts from a plurality of columns from a respective row.

4. The method of claim 1, wherein determining a dynamic threshold comprises:
determining a noise count for each post of a plurality of posts, each post comprising a vertical stack of voxels;
filtering the noise count for each voxel through a low-pass filter; and
scaling the filtered noise count for each voxel.

5. The method of claim 1, wherein determining a baseline threshold comprises determining a baseline threshold based on a percentage of the number of light pulses per post, each post comprising a vertical stack of voxels.

6. The method of claim 1, further comprising correcting a photon intensity of the three-dimensional image.

7. An apparatus comprising:
an interface configured to receive voxel data for each of a plurality of voxels, each voxel associated with a unique volume of space associated with a geographic area, the voxel data for each respective voxel comprising one or more values based on one or more reflections from one or more light pulses from a light detection and ranging (LIDAR) system; and
a processor coupled to the interface and configured to:
identify noise values from among the one or more values for each respective voxel;
determine a baseline threshold comprising a static value that is uniform for each of the plurality of voxels;
determine a dynamic threshold that varies between the plurality of voxels, the dynamic threshold based on the identified noise values, wherein the variation of the dynamic threshold between the plurality of voxels corresponds to spatial variations inherent in the LIDAR system;
apply the baseline threshold and the dynamic threshold to the voxel data to generate filtered voxel data;
generate a three-dimensional image based on the filtered voxel data;
determine an along-path histogram based on noise values from among the one or more values for each respective voxel along a flight path of the LIDAR system;
determine a cross-path histogram, the cross-path histogram based on noise values from among the one or more values for each respective voxel perpendicular to the flight path of the LIDAR system; and
multiply the along-path histogram by the cross-path histogram.

8. The apparatus of claim 7, wherein:
the voxels are arranged in a three-dimensional pattern comprising a plurality of rows, columns, and posts arranged orthogonally to one another, wherein:
each row of the plurality of rows comprises a plurality of voxels arranged substantially parallel to the flight path;
each column of the plurality of columns comprises a plurality of voxels arranged substantially perpendicular to the flight path; and
each post of the plurality of posts comprises a plurality of voxels arranged in a substantially vertical stack; and
the processor configured to determine an along-path histogram is further configured to, for each column of voxels, determine a total noise count based on a sum of noise from a plurality of posts from a plurality of rows from a respective column.

9. The apparatus of claim 7, wherein:
the voxels are arranged in a three-dimensional pattern comprising a plurality of rows, columns, and posts arranged orthogonally to one another, wherein
  each row of the plurality of rows comprises a plurality of voxels arranged substantially parallel to the flight path;
  each column of the plurality of columns comprises a plurality of voxels arranged substantially perpendicular to the flight path; and
  each post of the plurality of posts comprises a plurality of voxels arranged in a substantially vertical stack; and
the processor configured to determine a cross-path histogram is further configured to, for each row of voxels, determine a total noise count based on a sum of noise from a plurality of posts from a plurality of columns from a respective row.

10. The apparatus of claim 7, wherein the processor configured to determine a dynamic threshold is further configured to:
  determine a noise count for each post of a plurality of posts, each post comprising a vertical stack of voxels;
  filter the noise count for each voxel through a low-pass filter; and
  scale the filtered noise count for each voxel.

11. The apparatus of claim 7, wherein the processor configured to determine a baseline threshold is further configured to determine a baseline threshold based on a percentage of the number of light pulses per post, each post comprising a vertical stack of voxels.

12. The apparatus of claim 7, wherein the processor is further configured to correct a photon intensity of the three-dimensional image.

13. Logic embodied on a tangible non-transitory computer readable medium, that when executed is configured to:
  receive voxel data for each of a plurality of voxels, each voxel associated with a unique volume of space associated with a geographic area, the voxel data for each respective voxel comprising one or more values based on one or more reflections from one or more light pulses from a light detection and ranging (LIDAR) system;
  identify noise values from among the one or more values for each respective voxel;
  determine a baseline threshold comprising a static value that is uniform for each of the plurality of voxels;
  determine a dynamic threshold that varies between the plurality of voxels, the dynamic threshold based on the identified noise values, wherein the variation of the dynamic threshold between the plurality of voxels corresponds to spatial variations inherent in the LIDAR system;
  apply the baseline threshold and the dynamic threshold to the voxel data to generate filtered voxel data;
  generate a three-dimensional image based on the filtered voxel data;
  determine an along-path histogram based on noise values from among the one or more values for each respective voxel along a flight path of the LIDAR system;
  determine a cross-path histogram, the cross-path histogram based on noise values from among the one or more values for each respective voxel perpendicular to the flight path of the LIDAR system; and
  multiply the along-path histogram by the cross-path histogram.

14. The logic of claim 13, wherein:
the voxels are arranged in a three-dimensional pattern comprising a plurality of rows, columns, and posts arranged orthogonally to one another, wherein:
  each row of the plurality of rows comprises a plurality of voxels arranged substantially parallel to the flight path;
  each column of the plurality of columns comprises a plurality of voxels arranged substantially perpendicular to the flight path; and
  each post of the plurality of posts comprises a plurality of voxels arranged in a substantially vertical stack; and
the executed logic configured to determine an along-path histogram is, when executed, further configured to, for each column of voxels, determine a total noise count based on a sum of noise from a plurality of posts from a plurality of rows from a respective column.

15. The logic of claim 13, wherein:
the voxels are arranged in a three-dimensional pattern comprising a plurality of rows, columns, and posts arranged orthogonally to one another, wherein;
  each row of the plurality of rows comprises a plurality of voxels arranged substantially parallel to the flight path;
  each column of the plurality of columns comprises a plurality of voxels arranged substantially perpendicular to the flight path; and
  each post of the plurality of posts comprises a plurality of voxels arranged in a substantially vertical stack; and
the executed logic configured to determine a cross-path histogram is, when executed, further configured to, for each row of voxels, determine a total noise count based on a sum of noise from a plurality of posts from a plurality of columns from a respective row.

16. The logic of claim 13, wherein the executed logic configured to determine a dynamic threshold is, when executed, further configured to:
  determine a noise count for each post of a plurality of posts, each post comprising a vertical stack of voxels;
  filter the noise count for each voxel through a low-pass filter; and
  scale the filtered noise count for each voxel.

17. The logic of claim 13, wherein the executed logic configured to determine a baseline threshold is, when executed, further configured to determine a baseline threshold based on a percentage of the number of light pulses per post, each post comprising a vertical stack of voxels.

* * * * *